US008943954B2

(12) United States Patent
Conti et al.

(10) Patent No.: US 8,943,954 B2
(45) Date of Patent: Feb. 3, 2015

(54) FOOD PROCESSOR WITH CLEANING TOOL

(75) Inventors: Michael P. Conti, Saint Joseph, MI (US); Keeley Kabala, Elgin, IL (US); Kevin James Beber, Granger, IN (US); David J. Gushwa, Mishawaka, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 746 days.

(21) Appl. No.: 13/252,225

(22) Filed: Oct. 4, 2011

(65) Prior Publication Data
US 2012/0018559 A1   Jan. 26, 2012

Related U.S. Application Data

(63) Continuation-in-part of application No. 12/339,315, filed on Dec. 19, 2008, now Pat. No. 8,051,769.

(51) Int. Cl.
*B26D 3/22* (2006.01)
*B26D 3/18* (2006.01)
*A47J 43/07* (2006.01)
*B26D 7/08* (2006.01)
*B26D 7/18* (2006.01)
*B26D 1/29* (2006.01)

(52) U.S. Cl.
CPC ............. *A47J 43/0711* (2013.01); *B26D 3/185* (2013.01); *B26D 7/088* (2013.01); *B26D 7/1818* (2013.01); *B26D 1/29* (2013.01); *Y10S 83/932* (2013.01)
USPC ................... 99/537; 83/167; 83/168; 83/857; 83/932; 241/92; 241/166

(58) Field of Classification Search
CPC ....... A47J 43/0711; B26D 3/18; B26D 3/185; B26D 1/29; B26D 3/22; B26D 3/225; B26D 7/1818
USPC .............. 99/537, 538; 83/167, 168, 857, 932; 241/92, 166
IPC ............................... B26D 3/18, 3/22
See application file for complete search history.

(56) References Cited

U.S. PATENT DOCUMENTS

| | | | | | |
|---|---|---|---|---|---|
| 2,226,317 | A | * | 12/1940 | Myers ........................... | 241/166 |
| 3,519,048 | A | * | 7/1970 | Reifenhauser .................. | 83/168 |
| 3,664,396 | A | * | 5/1972 | Tremblay ...................... | 425/152 |
| 4,145,941 | A | * | 3/1979 | Davis ............................. | 83/167 |
| 4,406,603 | A | * | 9/1983 | Williams ...................... | 425/191 |
| 4,560,111 | A | * | 12/1985 | Cavalli .......................... | 241/92 |
| 4,572,443 | A | * | 2/1986 | Coleman ....................... | 241/166 |
| 4,579,028 | A | * | 4/1986 | Neidhardt ...................... | 83/109 |
| 4,877,191 | A | * | 10/1989 | Golob et al. ................... | 241/92 |
| 5,379,954 | A | * | 1/1995 | Funke ........................ | 241/101.2 |
| 5,947,016 | A | * | 9/1999 | Repac et al. .................... | 99/538 |
| 6,209,439 | B1 | * | 4/2001 | Repac et al. .................... | 83/858 |
| 6,945,486 | B2 | * | 9/2005 | Teng ........................... | 241/169.1 |
| 2004/0060414 | A1 | * | 4/2004 | Sundqvist ...................... | 83/663 |
| 2008/0156913 | A1 | * | 7/2008 | Orent ........................... | 241/37.5 |

FOREIGN PATENT DOCUMENTS

| | | | | | |
|---|---|---|---|---|---|
| DE | 8233223 | U1 | * | 12/1985 | .............. A47J 43/25 |
| FR | 2548573 | A1 | * | 1/1985 | .............. B26D 3/18 |
| FR | 2887133 | A1 | * | 12/2006 | .......... A47J 43/0705 |
| GB | 1144724 | A | * | 3/1969 | ............. B26D 3/185 |
| JP | 10033392 | A | * | 2/1998 | .............. A47J 43/25 |

* cited by examiner

*Primary Examiner* — Stephen F Gerrity

(57) ABSTRACT

A food processor having a dicing tool and a cleaning tool to clean out the dicing tool.

15 Claims, 17 Drawing Sheets

US 8,943,954 B2

FOOD PROCESSOR WITH CLEANING TOOL

CROSS-REFERENCE TO RELATED APPLICATION

The present application is a continuation-in-part of U.S. application Ser. No. 12/339,315, filed Dec. 19, 2008, and which is incorporated by reference herein in its entirety.

BACKGROUND OF THE INVENTION

Food processors and tools within them are used to prepare food items by conducting a processing operation, such as slicing, grating, or shredding, on the food item. Each processing operation is conducted by a different processing tool, which must be replaced when switching between each processing operation. In the case of dicing/cubing tools, there is a tendency for the tools to become clogged and they must be manually cleaned before continuing to process food.

SUMMARY OF THE INVENTION

A food processor having a dicing tool and a cleaning tool which may be used to clean out the dicing tool.

DESCRIPTION OF THE EMBODIMENTS OF THE INVENTION

Figure 1:
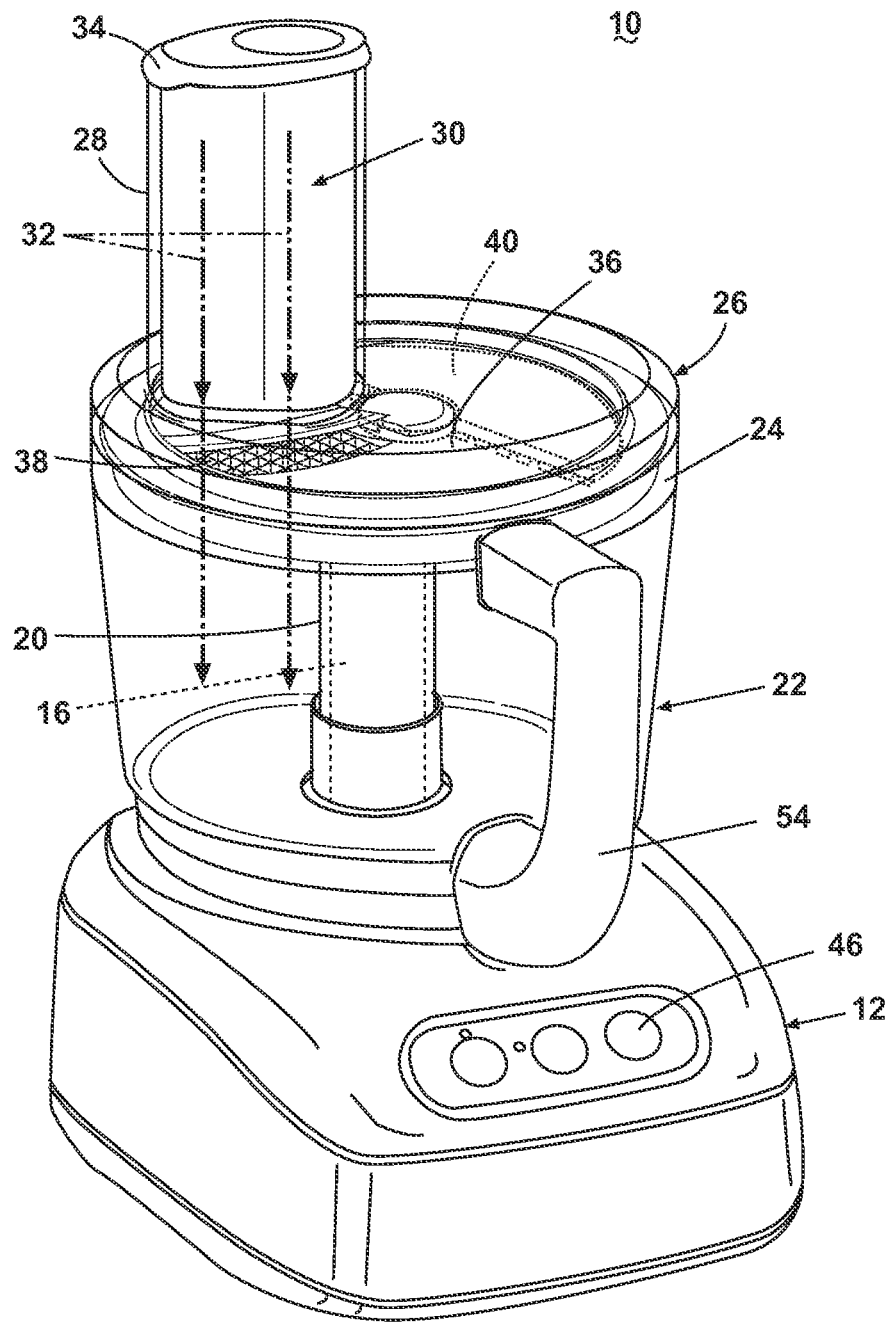
FIG. 1 is a perspective view of a food processor according to a first embodiment of the invention.

Referring now to the figures, FIG. 1 illustrates a food processor 10 according to one embodiment of the invention. The food processor 10 shares many features of a conventional food processor, which will not be described in detail herein except as necessary for a complete understanding of the invention. The food processor 10 includes a base 12 that acts as the base of the food processor 10. A receptacle or a bowl 22 for receiving the processed food, usually made of transparent plastic is supported on the base. The bowl 22 terminates in an open top defined by a lip 24.

A lid 26 may be removably received on the bowl 22. Thus, the bowl 22 may be closed by the lid 26, which may be removably secured to the bowl 22 by a snap fit, a twist lock arrangement, or any other suitable means of attachment. A feed chute 28 extends upwardly from the lid 26. A food pusher 30 may be sized to slide through the feed chute 28. A stop, in the form of a flange 34, is provided on the food pusher 30 to limit the insertion of the food pusher 30 into the feed chute 28.

The bowl 22, lid 26, and feed chute 28 can be collectively referred to as a housing. A cutting tool 36, dicing tool 38, and clean-out tool 40 are located within the housing. It is also possible for the base 12 to part of the housing. However, in the illustrated embodiment, the housing is supported by the base 12. The bowl 22 and lid 26 are illustrated as being transparent, but need not be.

Figure 2:
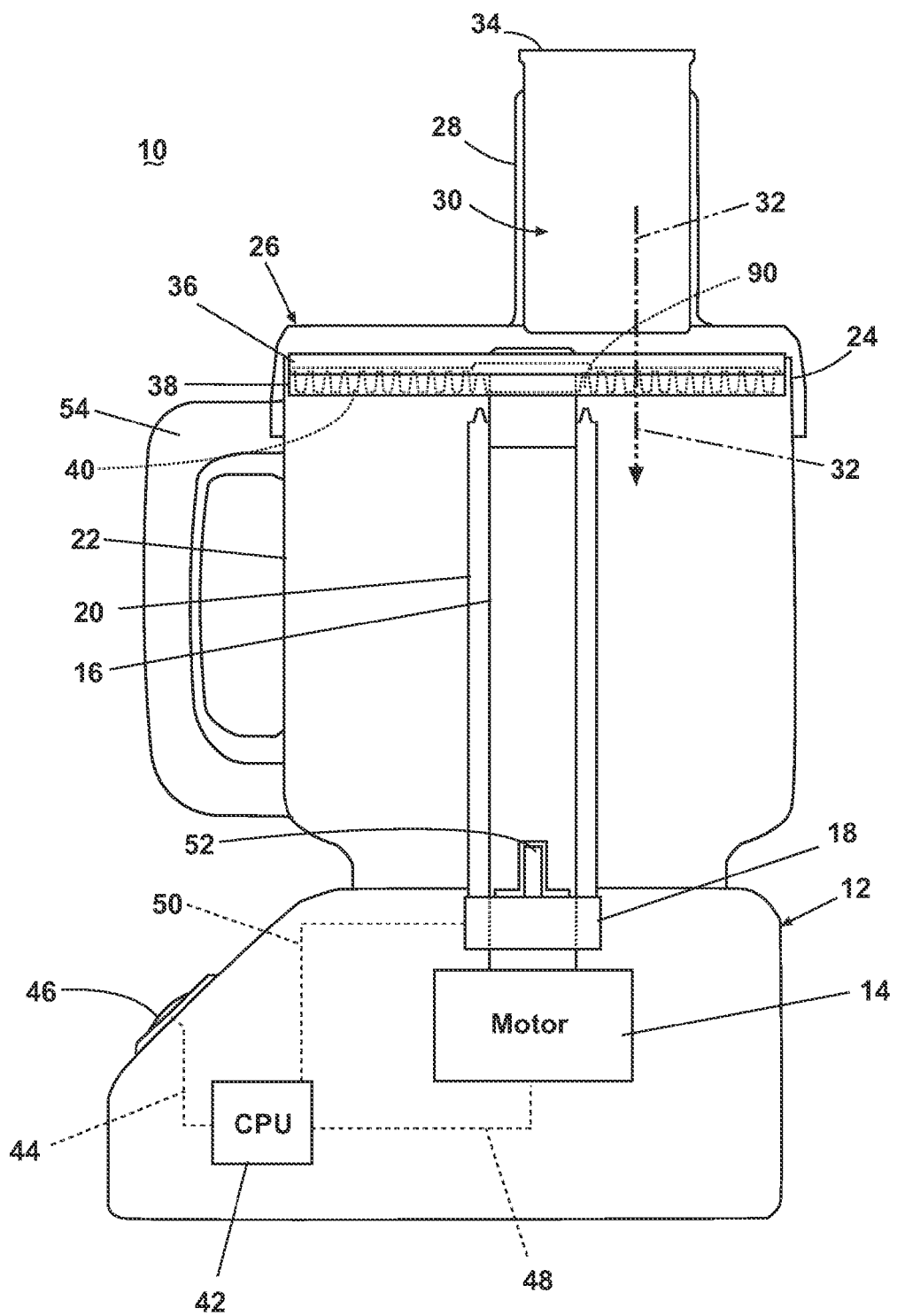
FIG. 2 is a schematic view of the food processor of FIG. 1.

Referring to FIG. 2, a food processing path 32 extends through the housing. The feed chute 28 forms an inlet to the food processing path 32. In this case, the lid 26 and feed chute 28 act as a food guide configured to receive food for processing. The food processing path 32 extends from the feed chute 28 through the cutting tool 36 and a portion of the dicing tool 38. The food processing path 32 ends when the processed food is deposited in the bowl 22.

The cutting tool 36 is supported on the output shaft 16 and the dicing tool 38 is supported by the bowl 22, such as by press-fitting into the open top of the bowl 22. The cleanout-tool 40 is supported by the portion of the dicing tool 38 that is not located in the food processing path 32.

The base 12 may include a motor 14 having an output shaft 16 that extends from the base 12. A drive shaft 52 extends from the base 12. The drive shaft 52 is operably coupled with the motor 14, and may be used to provide rotational movement to the output shaft 16 that extends into the food processing chamber formed by the bowl 22 and the lid 26. The base 12 may also include an actuator or solenoid motor 18 that may raise and lower a sleeve 20 formed around a portion of the output shaft 16. The sleeve 20 is slidably mounted to the output shaft 16 for axial movement along the output shaft 16. Alternative actuators such as a servo motor may be used.

A control system may be provided for controlling the operation of the food processor 10. The control system as illustrated includes a controller 42, which is electrically coupled through a user interface lead 44 to a user interface or control panel 46. The control panel 46 may be provided on the base 12 and may include operational controls such as dials, lights, switches, and displays enabling a user to control the operation of the food processor 10. The motor 14 may be electrically coupled through a control lead 48 to the controller 42. The solenoid motor 18 may be electrically coupled through a control lead 50 to the controller 42. The food processor 10 may be preprogrammed with a number of different food processing options from which a user may select a food processing option to process a food item.

Figure 3:
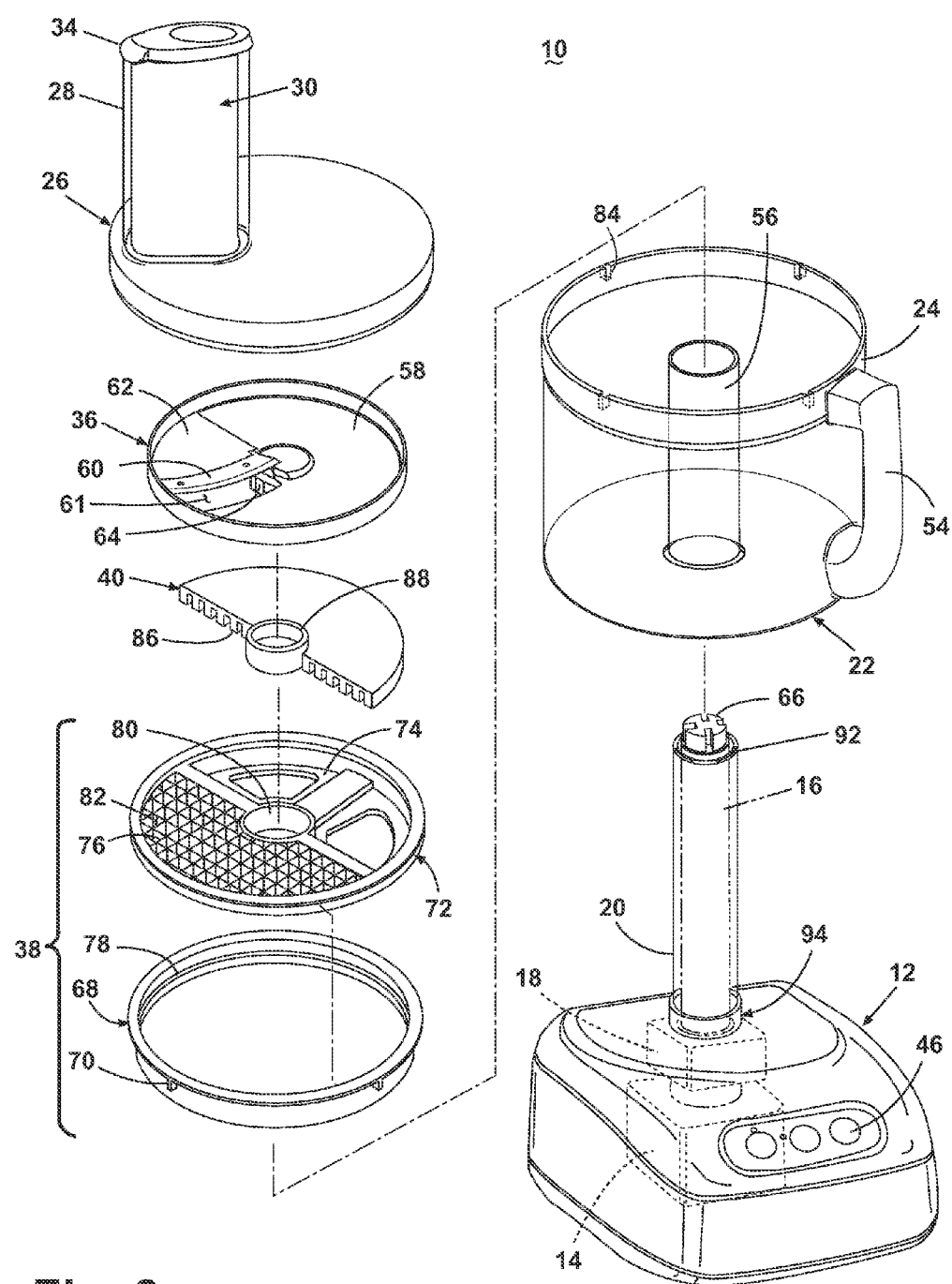
FIG. 3 is an exploded view of the food processor of FIG. 1.

With reference to FIG. 3, the different elements of the food processor 10 will be described in greater detail. A handle 54 is provided on the bowl 22 so that a user may more easily maneuver the bowl 22. A guide 56 in the form of a tube projects into the bowl 22. The output shaft 16 is received within the guide 56 when the bowl 22 is mounted to the base 12, which may be achieved by a snap-fit, a twist-lock arrangement, or any other suitable means of attachment.

The cutting tool 36 is illustrated as being a rotatable cutting disc having a planar portion 58. A cutting blade 60 is provided above the planar portion 58 and defines an opening 61 there between, such that food cut by the rotation of the cutting tool 36 passes through the opening 61 and to the dicing tool 38. A ramp portion 62 slopes from the cutting blade 60 to the planar portion 58. The ramp portion 62 acts to push the cut food entering the opening 61 through the dicing tool 38. The cutting tool 36 and cutting blade 60 may be made of metal or any other suitable material.

The cutting tool 36 may be operably coupled to the output shaft 16 above the dicing tool 38. The cutting tool 36 has a hub 64 that is complementarily keyed to mate with the upper end 66 of the output shaft 16 such that rotation of the output shaft 16 will rotate the cutting tool 36. The cutting tool 36 is selectively moveable through the food processing path 32 and the cutting blade 60 acts to cut food as it passes through the food processing path 32.

The dicing tool 38 may include a frame 68 having keys 70, a body 72, a pocket 74 carried by the body, and a dicing element 76 carried by the body. The frame 68 is a ring frame having keys 70 that locate the dicing tool 38 within the lip 24 of the bowl 22. The keys 70, and corresponding keyways 84 on the bowl 22, locate the dicing tool 38 within the bowl 22. Alternatively, the dicing tool 38 may be mounted to the lid 26.

The frame 68 may have a channel 78 on its inner surface. The body 72 may be mounted in the channel 78. The body 72 of the dicing tool 38 has a central portion 80 capable of receiving the sleeve 20. The pocket 74 is formed in a portion of the body. The dicing element 76 is formed in another portion of the body. The dicing element 76 is illustrated as being formed of a dicing grid or multiple intersecting elements that define multiple dicing openings 82 through which the cut food must pass to dice the cut food. Alternatively, the dicing openings 82 may be formed in any other suitable manner and may be of any shape including circular or oval.

It has been contemplated that the dicing tool 38 may have more than one size dicing opening 82. Further, it is has been contemplated that the dicing element 76 may have multiple partitions with different size dicing openings 82, and that rotation of the body 72 may be used to locate a particular partition within the food processing path 32. The body 72 may be rotated by any method, examples of which are disclosed in U.S. application Ser. No. 12/339,290, filed Dec. 19, 2008, entitled Food Processor with Dicing Tool, which is incorporated herein by reference in its entirety. The dicing element 76 may be made of metal or any material suitable for processing food items. Although, the dicing openings 82 have been illustrated as square, the dicing openings 82 may be of any shape including circular or oval.

Figure 4:
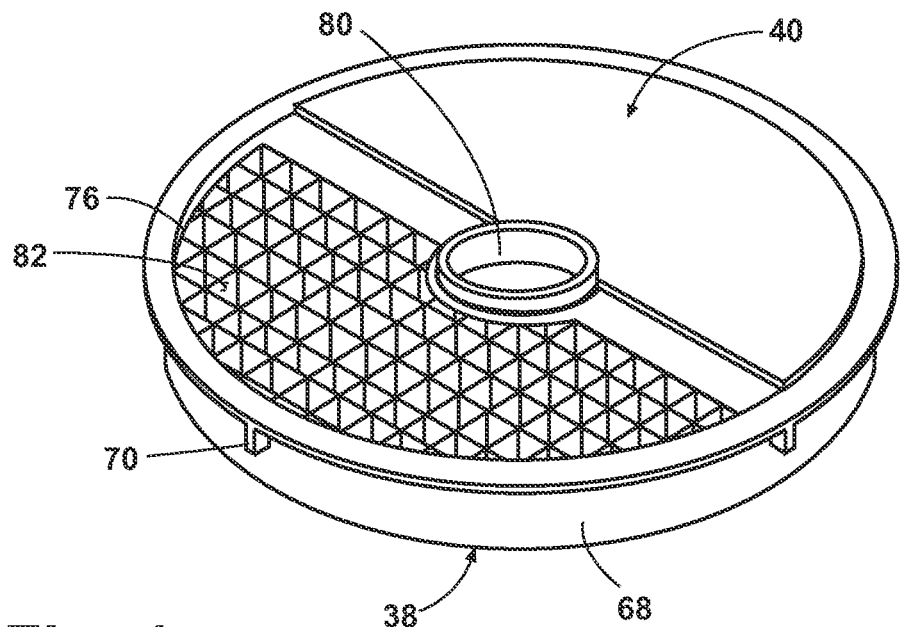
FIG. 4 is a perspective view of a dicing tool and a cleaning tool of the food processor of FIG. 1, with the cleaning tool in a stored position.
Figure 5:
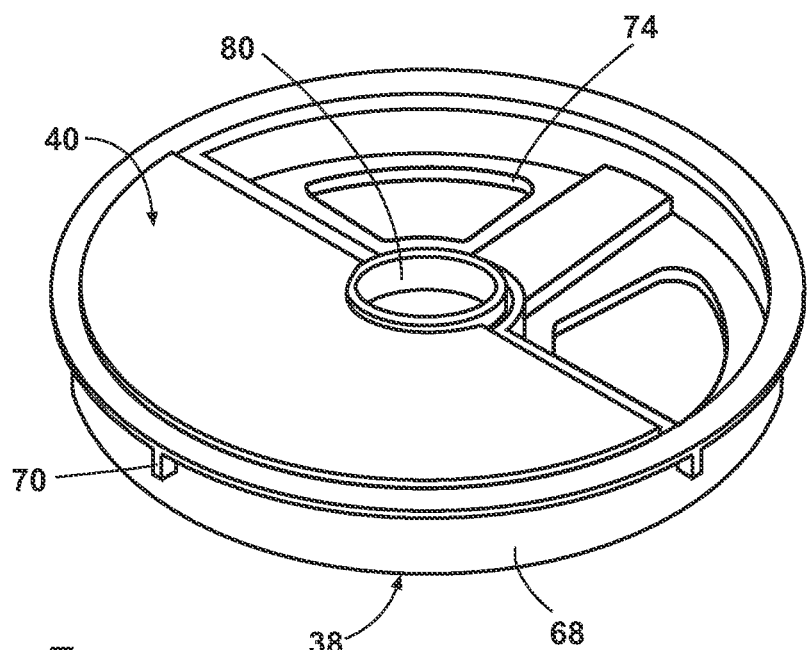
FIG. 5 is a perspective view of the dicing tool and cleaning tool of the food processor of FIG. 1, with the cleaning tool in a use position.

The clean-out tool 40 has multiple projections 86 sized to be received within the dicing openings 82. The clean-out tool 40 may also include a coupling mechanism 88, capable of receiving the sleeve 20, with a keyway 90 (FIG. 2) on the underside of the coupling mechanism 88, which selectively mates with a complementary crown structure 92 on the upper end of the sleeve 20 to effect the movement of the cleanout tool from a stored position (FIG. 4), where the cleanout tool is received within the pocket 74, to a use position (FIG. 5), where the projections 86 of the cleanout tool are received within the dicing openings 82.

Regarding the operation of the food processor 10, after the bowl 22 is positioned on the base 12 and the drive shaft 52 and output shaft 16 are coupled, a user may place the dicing tool 38 within the lip 24 of the bowl 22 by placing it over the upper end 66 of the output shaft 16. The user may then place the clean-out tool 40 in the pocket 74 of the dicing tool 38 with the coupling mechanism 88 placed over the upper end 66 of the output shaft 16. The user may then place the cutting tool 36 on the upper end 66 of the output shaft 16. The user may then position the lid 26 on the bowl 22 and deliver food through the feed chute 28 into the bowl 22.

The user may then activate the motor 14 causing the drive shaft 52, output shaft 16, and cutting tool 36 to rotate. The food may be pushed down to the cutting tool 36 using the food pusher 30 where the food then contacts the cutting blade 60, at which point it is sliced and then it is pushed by the ramp portion 62 through the dicing tool 38 and into the bowl 22.

A user may use the clean-out tool 40 to remove any food stuck in the dicing openings 82 of the dicing element 76. The user may selectively move the clean-out tool 40 into the dicing openings 82 by operating a drive mechanism 94 through the control panel 46. The drive mechanism 94 includes the solenoid motor 18, the drive shaft 52, the output shaft 16, and the sleeve 20.

The use of the clean-out tool 40 for cleaning out the dicing element 76 is illustrated in FIGS. 6A-D. Beginning with FIG. 6A, the clean-out tool 40 is shown in the stored position as the sleeve 20 is axially raised in response to the controller 42 actuating the solenoid motor 18. The axial raising of the sleeve 20 mates the keyway 90 of the coupling mechanism 88 with the crown structure 92 on the upper end of the sleeve 20.

Figure 6A:
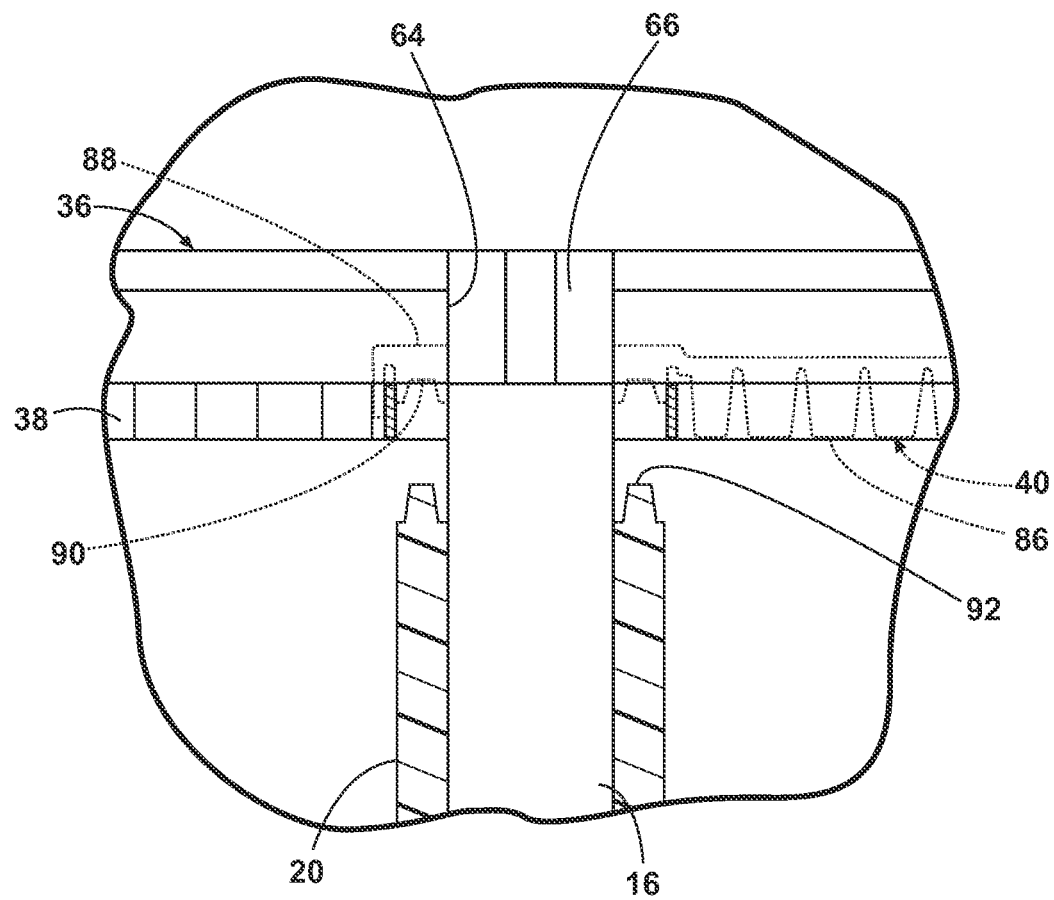
FIG. 6A is a partial schematic view of the food processor of FIG. 1 with the clean-out tool in the stored position.
Figure 6B:
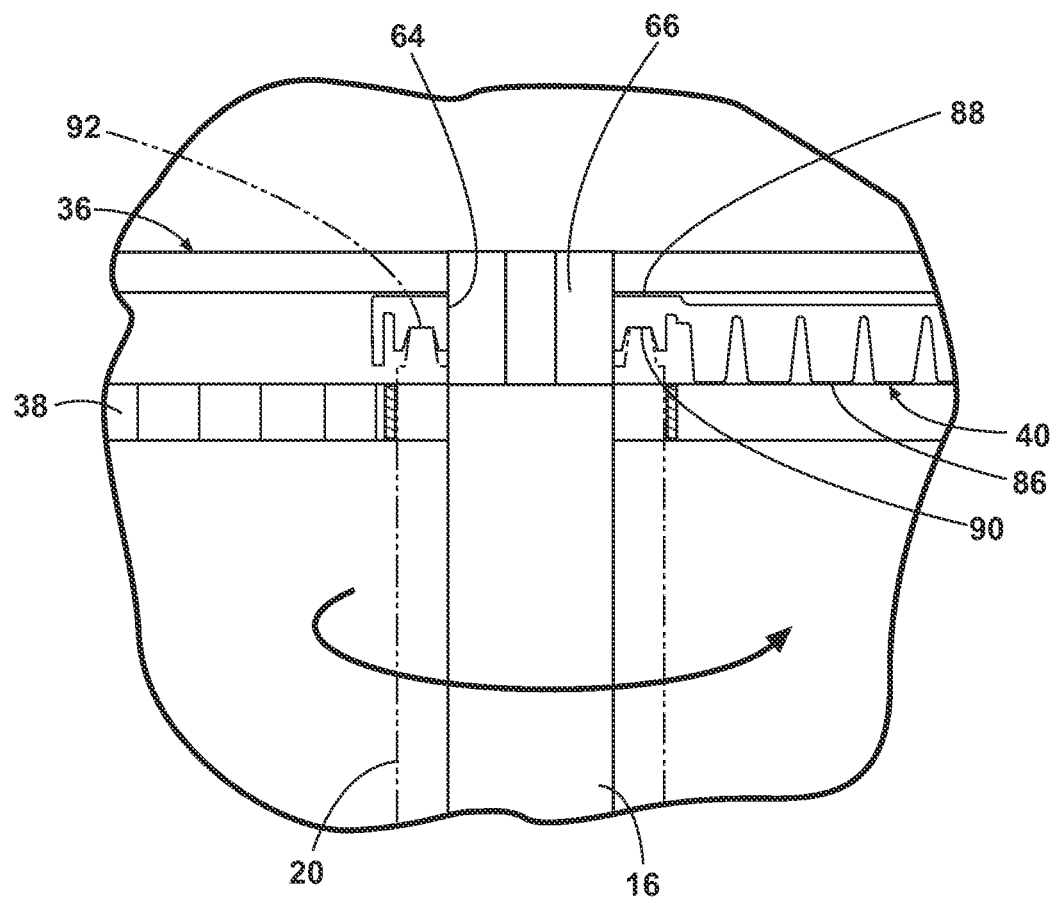
FIG. 6B is a partial schematic view of the food processor of FIG. 1 with the clean-out tool raised out of the stored position.
Figure 6C:
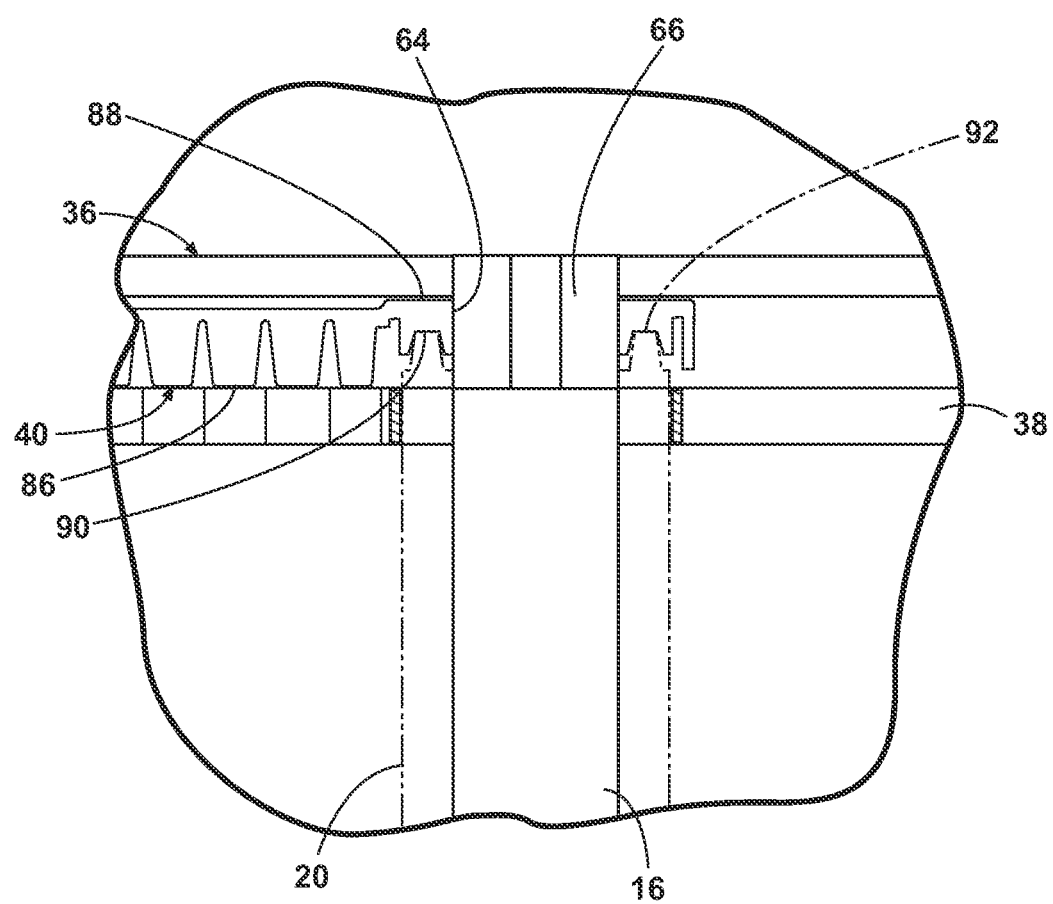
FIG. 6C is a partial schematic view of the food processor of FIG. 1 with the clean-out tool rotated above the dicing element.
Figure 6D:
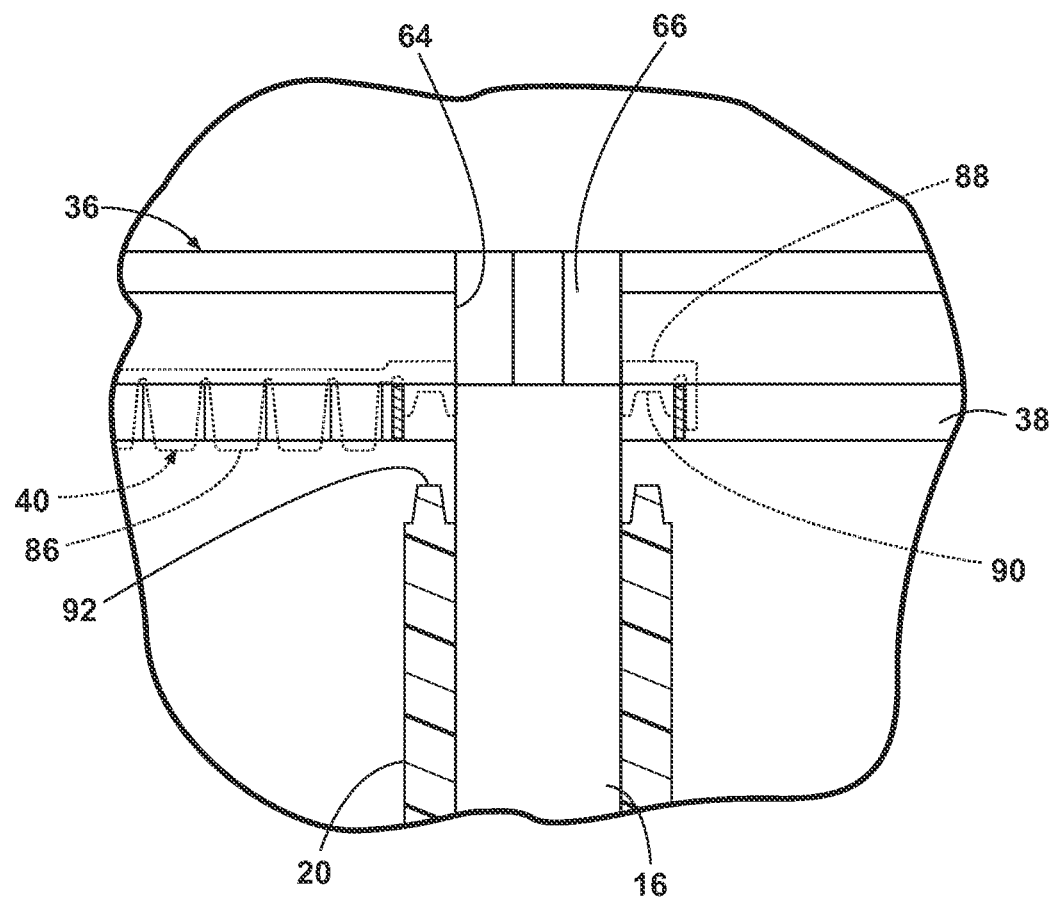
FIG. 6D is a partial schematic view of the food processor of FIG. 1 with the clean-out tool lowered into the use position.

Referring to FIG. 6B, the continued axial raising of the sleeve 20, moves the clean-out tool out of the stored position and above the pocket 74. The controller 42 then signals the motor 14 to rotate the drive shaft 52 and thus the output shaft 16 and sleeve 20 until the clean-out tool is above the dicing element 76 as illustrated in FIG. 6C. Once the clean-out tool 40 is moved over the dicing element 76 and the multiple projections 86 are over the dicing openings 82, the solenoid motor 18 is deactivated to axially lower the sleeve 20 to lower the clean-out tool into the use position as illustrated in FIG. 6D. As the clean-out element is lowered into the use position, any food remaining in the dicing openings 82 being purged from the dicing element 76 as the multiple projections 86 are lowered into the dicing openings 82.

While not illustrated, the sleeve 20 may be configured to actively lower the cleanout tool. For example, the coupling mechanism 88 may be provided with closed-end slots (not shown) and the sleeve 20 with projections sized to be received within the slots. The axial raising of the sleeve 20 will locate the projections into the open end of the slots. The rotation of the sleeve 20 will move the projections into abutment with the closed end of the slots. Subsequent rotation of the sleeve 20 after abutment of the projections and closed end of the slots results in rotation of the clean-out tool 40.

To return the clean-out tool 40 to its first uncoupled position, the previous operation is reversed. That is, the controller 42 then signals the solenoid motor 18 to raise the sleeve 20 along the output shaft 16 until the keyway 90 of the coupling mechanism 88 mates with the crown structure 92 on the upper end of the sleeve 20. The controller 42 then signals the motor 14 to rotate the drive shaft 52 and thus the output shaft 16 and sleeve 20 until the clean-out tool is above the pocket 74. Once the clean-out tool 40 is moved over the pocket 74, the solenoid motor 18 is deactivated to uncouple the crown structure 92 from the keyway 90 and clean-out tool 40 is lowered into the pocket 74 and the clean-out tool 40 is again in the first uncoupled position.

Figure 7:
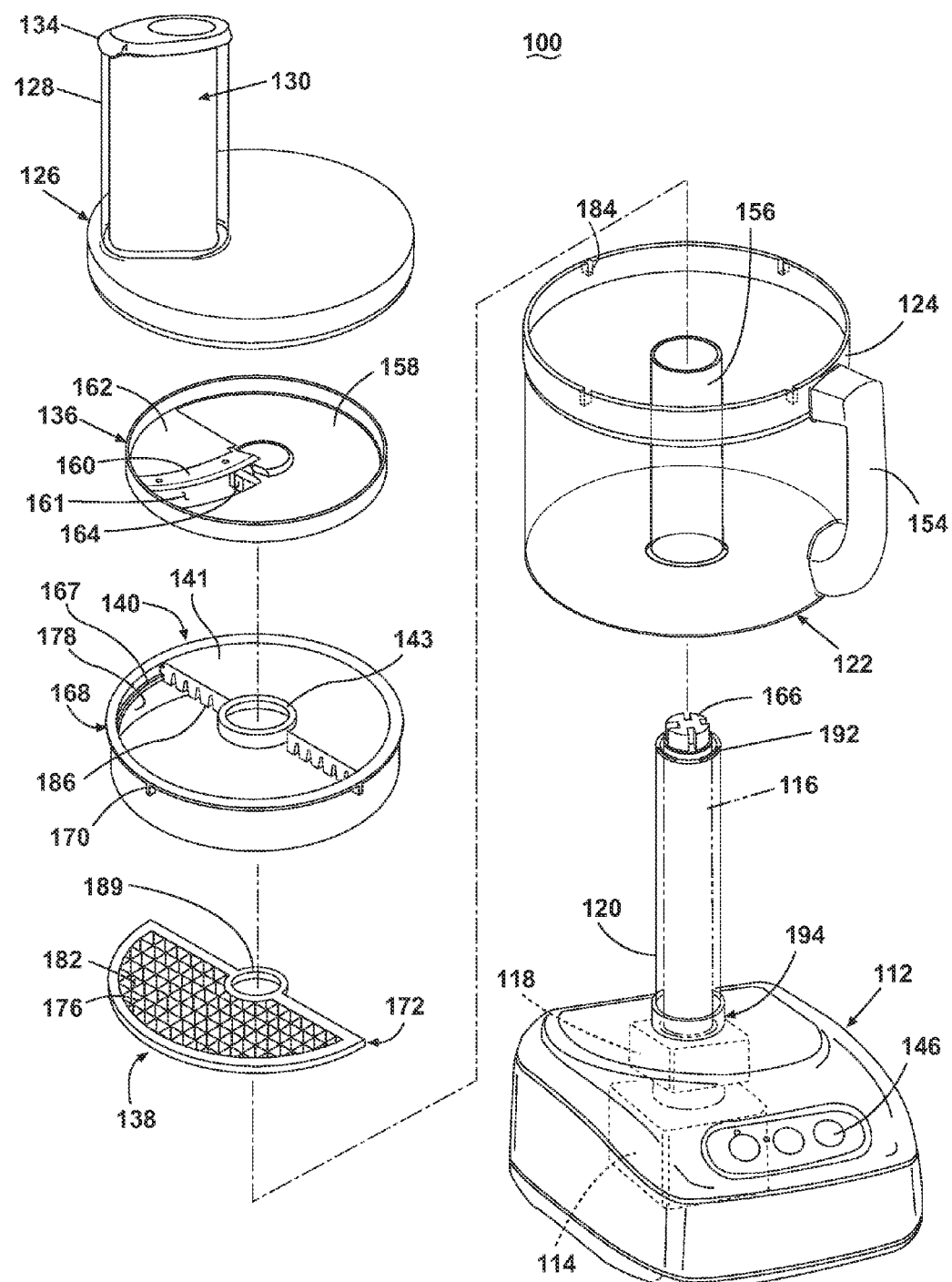
FIG. 7 is an exploded view of a food processor according to a second embodiment of the invention.

FIG. 7 illustrates an exploded view of a food processor 100 according to a second embodiment of the invention. The food processor 100 is similar to the food processor 10 previously described, and, therefore, like parts will be identified with like numerals increased by 100, with it being understood that the description of the like parts of the food processor 10 applies to the food processor 100, unless otherwise noted.

One difference between the food processor 10 and the food processor 100 is that the dicing tool 138 is selectively moveable and the clean-out tool 140 is stationary and the drive mechanism, which is illustrated as the sleeve 120, may be coupled to the dicing tool 138 to selectively move the dicing tool 138 into the clean-out tool 140 to remove food remaining in the dicing openings 182. By way of non-limiting example, the clean-out tool 140 is illustrated as including a clean-out element or clean-out body 141 and a frame 168 having keys 170. A support 167 in the frame 168 may support the clean-out body 141. The clean-out body 141 has multiple projections 186 sized to be received within the dicing openings 182 of the dicing tool 138 and includes a central portion 143 capable of receiving the output shaft 116. The frame 168 is a ring frame having keys 170 that locate the clean-out tool 140 within the lip 124 of the bowl 122. The keys 170, and corresponding keyways 184 on the bowl 122, locate the clean-out tool 140 within the bowl 122 and fix the clean-out tool 140 in place. Alternatively, the clean-out tool 140 may be mounted to the lid 126 and fixed in place. The frame 168 may have a portion 178 on its inner surface within which the dicing tool 138 may be moveably received.

As with the first embodiment the dicing tool 138 may include a dicing element 176 that defines multiple dicing openings 182 through which the cut food must pass to dice the cut food. The dicing tool 138 may also include a coupling mechanism 189, capable of receiving the sleeve 120, with a keyway 191 (FIG. 8A) on the underside of the coupling mechanism 189, which selectively mates with a complementary crown structure 192 on the upper end of the sleeve 120 to effect the movement of the dicing tool 138 from a use position, where the dicing tool 138 is within the food processing path (FIG. 8A), to a cleaning position (FIG. 8C), where the dicing tool 138 is moved out of the food processing path and into the clean-out tool 140 such that the projections 186 of the clean-out tool 140 are received within the dicing openings 182 of the dicing tool 138.

Regarding the operation of the food processor 100, after the bowl 122 is positioned on the base 112 a user may place the dicing tool 138 within the bowl 122 by placing it over the upper end 166 of the output shaft 116. The user may then place the clean-out tool 140 within the bowl 122 by placing it over the upper end 166 of the output shaft 116. The user may then place the cutting tool 136 on the upper end 166 of the output shaft 116. The user may then position the lid 126 on the bowl 122 and deliver food through the feed chute 128 into the bowl 122.

Once food is diced, a user may use the clean-out tool 140 to remove any food stuck in the dicing openings 182 of the dicing element 176. The user may selectively move the dicing tool 138 into the clean-out tool 140 such that the projections 186 are within the dicing openings 182 by operating a drive mechanism 194 through the control panel 146. The drive mechanism 194 includes the solenoid motor 118, the drive shaft 152, the output shaft 116, and the sleeve 120.

Figure 8A:
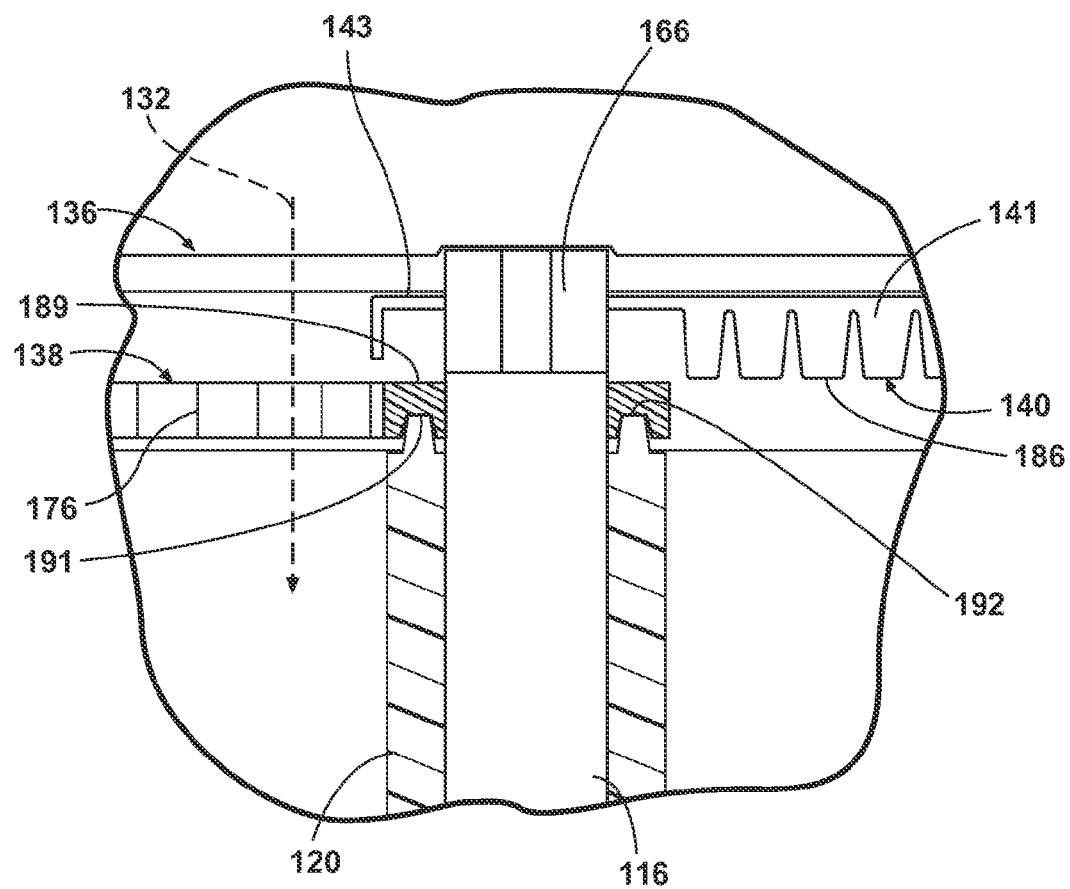
FIG. 8A is a partial schematic view of the food processor of FIG. 7 with a dicing tool in the use position.
Figure 8B:
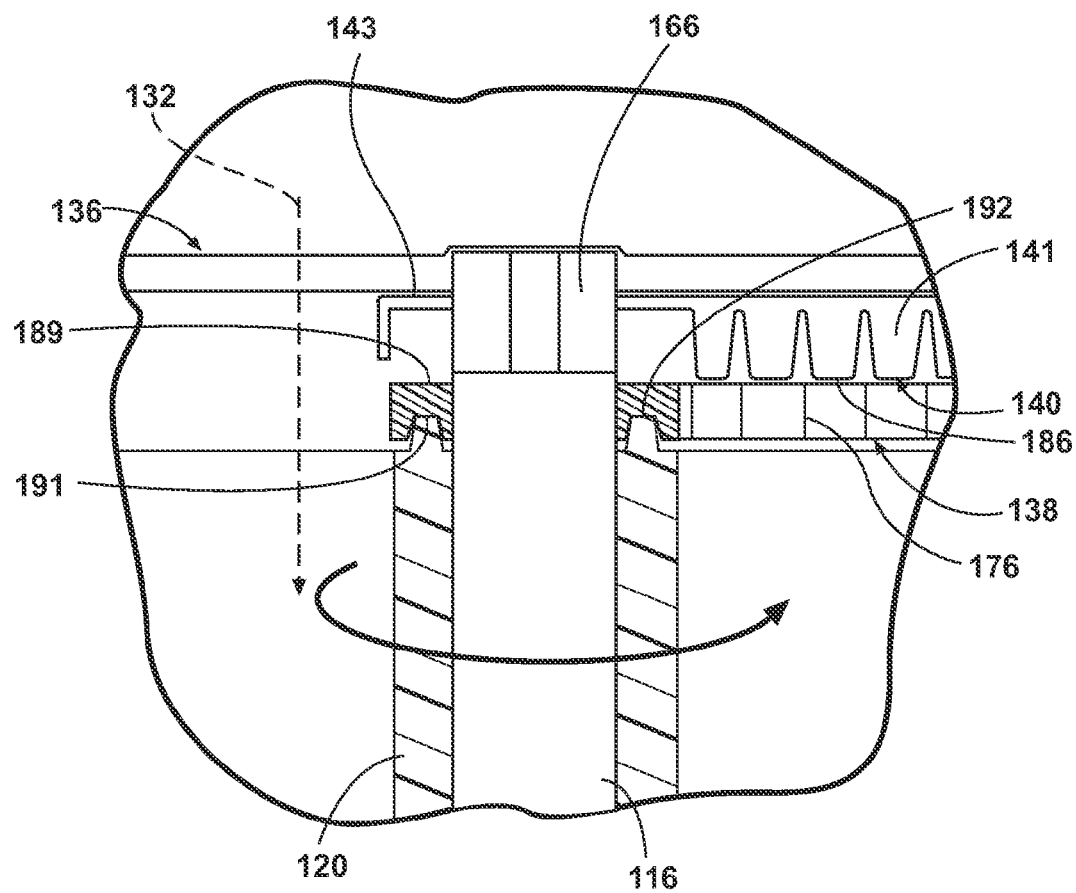
FIG. 8B is a partial schematic view of the food processor of FIG. 7 with the dicing tool rotated below a clean-out element.
Figure 8C:
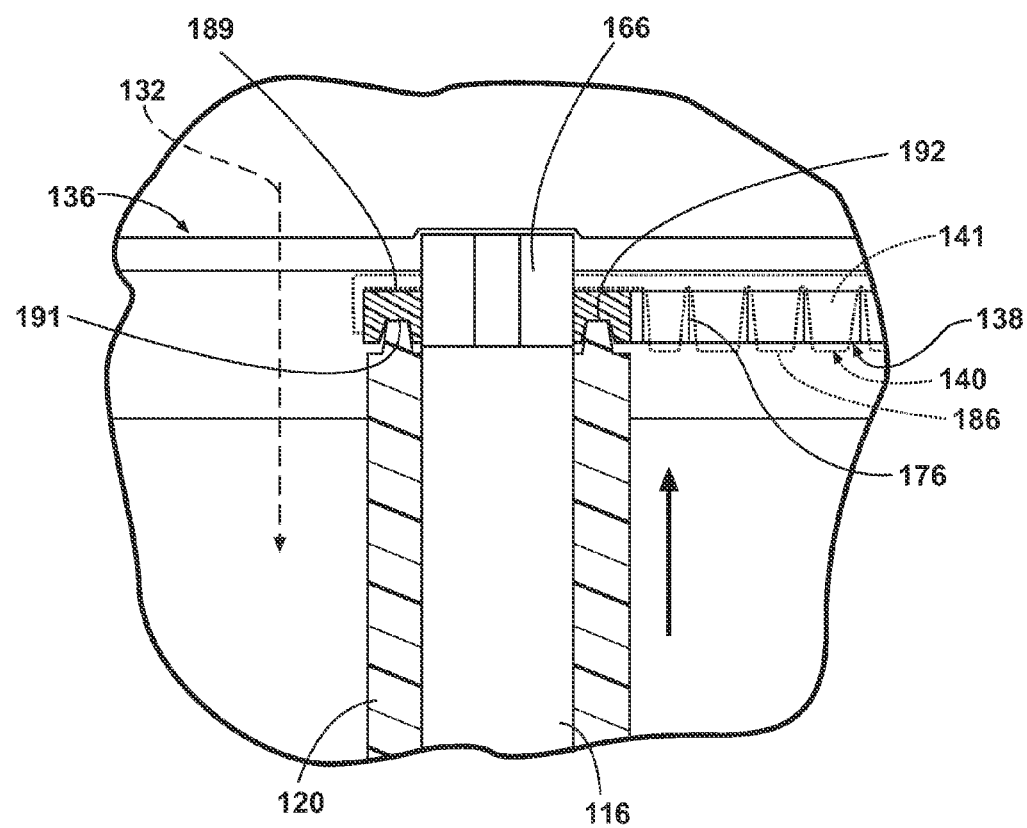
FIG. 8C is a partial schematic view of the food processor of FIG. 7 with the dicing tool raised into a cleaning position.

The use of the clean-out tool 140 for cleaning out the dicing element 176 is illustrated in FIGS. 8A-C. Beginning with FIG. 8A, the dicing tool 138 is shown in the use position. In this position, the keyway 191 of the coupling mechanism 189 is operably coupled with the crown structure 192 on the upper end of the sleeve 120. The controller 142 may signal the motor 114 to rotate the drive shaft 152 and, thus, the output shaft 116 and sleeve 120 until the dicing tool 138 is below the clean-out body 141 in a non-use position as illustrated in FIG. 8B. Once the dicing tool 138 is moved below the clean-out body 141 and the multiple projections 186 are over the dicing openings 182, the solenoid motor 118 is activated to axially raise the sleeve 120 to raise the dicing tool 138 into the clean-out body 141 such that the dicing tool 138 is then in the cleaning position as illustrated in FIG. 8C. As the dicing tool 138 is raised into the cleaning position, any food remaining in the dicing openings 182 may be purged from the dicing element 176 as the multiple projections 186 are brought into the dicing openings 182. To return the dicing tool 138 to the position, the previous operation is reversed. That is, the controller 142 then signals the solenoid motor 118 to lower the sleeve 120 along the output shaft 116 and then signals the motor 114 to rotate the drive shaft 152 and, thus, the output shaft 116 and sleeve 120 until the dicing tool 138 is in the use position.

It is also contemplated that the food processor may have an alternative design wherein the sleeve 120 may be operably coupled with the dicing tool 138 such that the dicing tool 138 may be actively lowered from the use position, rotated, and raised into the fixed clean-out body 141 to remove food within the dicing openings and that following the removal of food, the sleeve 120 may then be operated to lower, rotate, and raise the dicing tool 138 back into the use position.

Figure 9:
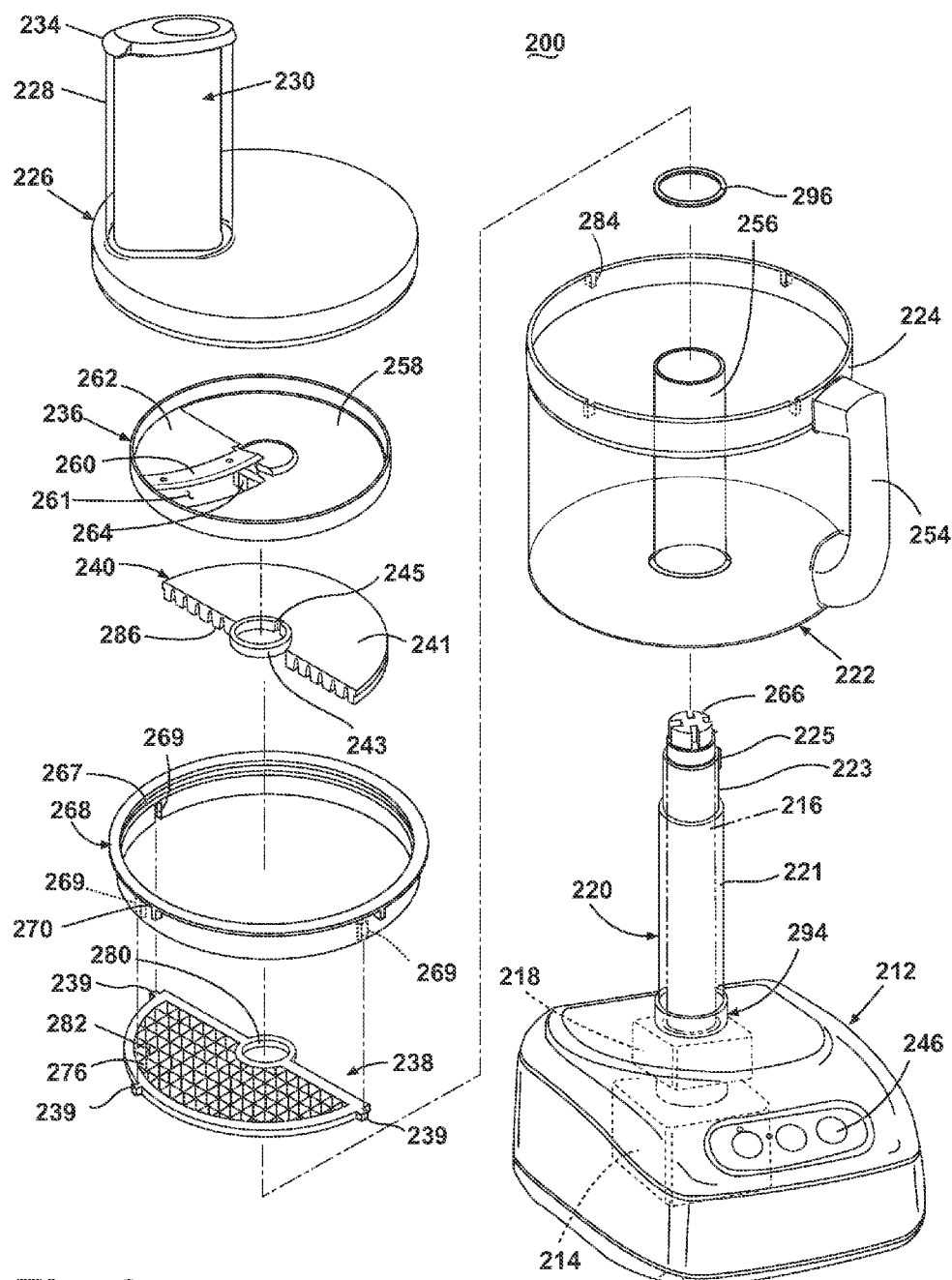
FIG. 9 is an exploded view of a food processor according to a third embodiment of the invention.

FIG. 9 illustrates an exploded view of a food processor 200 according to a third embodiment of the invention. The food processor 200 is similar to the food processor 100 previously described, and, therefore, like parts will be identified with like numerals increased by 100, with it being understood that the description of the like parts of the food processor 100 applies to the food processor 200, unless otherwise noted.

In the third embodiment, the dicing tool 238 is selectively axial moveable within the frame 268 through raising and lowering of the sleeve 220 and the clean-out tool 240 may be rotated within the frame 268. As with the second embodiment, the dicing tool 238 may include a dicing element 276 that defines multiple dicing openings 282 through which the cut food must pass to dice the cut food. The dicing tool 238 may also include several keys 239, which may be received within corresponding keyways 269 within the frame 268 such that the dicing tool may move vertically within the frame 268.

Another difference is that the sleeve 220 includes a larger diameter lower portion 221 and a smaller diameter upper portion 223. The central portion 280 of the dicing tool 238 may be capable of receiving the upper portion 223 of the sleeve 220 and may be carried upon the lower portion 221. A bearing or washer 296 may be included between the lower portion 221 of the sleeve 220 and the dicing tool 238 to reduce friction between them such that the sleeve 220 may freely rotate. The washer 296 may be formed from any suitable material including by way of non-limiting example Teflon. The thinner upper portion 223 of the sleeve 220 may include a key structure 225.

By way of non-limiting example, the clean-out tool 240 is illustrated as including a clean-out body 241 having multiple projections 286 sized to be received within the dicing openings 282 of the dicing tool 238. The clean-out tool 240 may include a central portion 243 capable of receiving the thinner upper portion 223 of the sleeve 220 and may include a keyway 245, which may receive the key structure 225. The frame 268 may include a support 267 upon which the clean-out tool 240 may be rotationally supported.

Regarding the operation of the food processor 200, after the bowl 222 is positioned on the base 212 a user may place the dicing tool 238 within the frame 268 and place the frame 268 within the bowl 222 by placing it over the upper end 266 of the output shaft 216. The user may then place the clean-out tool 240 within the bowl 222 by placing it over the upper end 266 of the output shaft 216. The user may then place the cutting tool 236 on the upper end 266 of the output shaft 216. The user may then position the lid 226 on the bowl 222 and deliver food through the feed chute 228 into the bowl 222.

Once food is diced, a user may use the clean-out tool 240 to remove any food stuck in the dicing openings 282 of the dicing element 276. The user may selectively clean the dicing tool 238 by operating the drive mechanism 294 through the control panel 246. The drive mechanism 294 includes the solenoid motor 218, the drive shaft 252, the output shaft 216, and the sleeve 220.

Figure 10A:
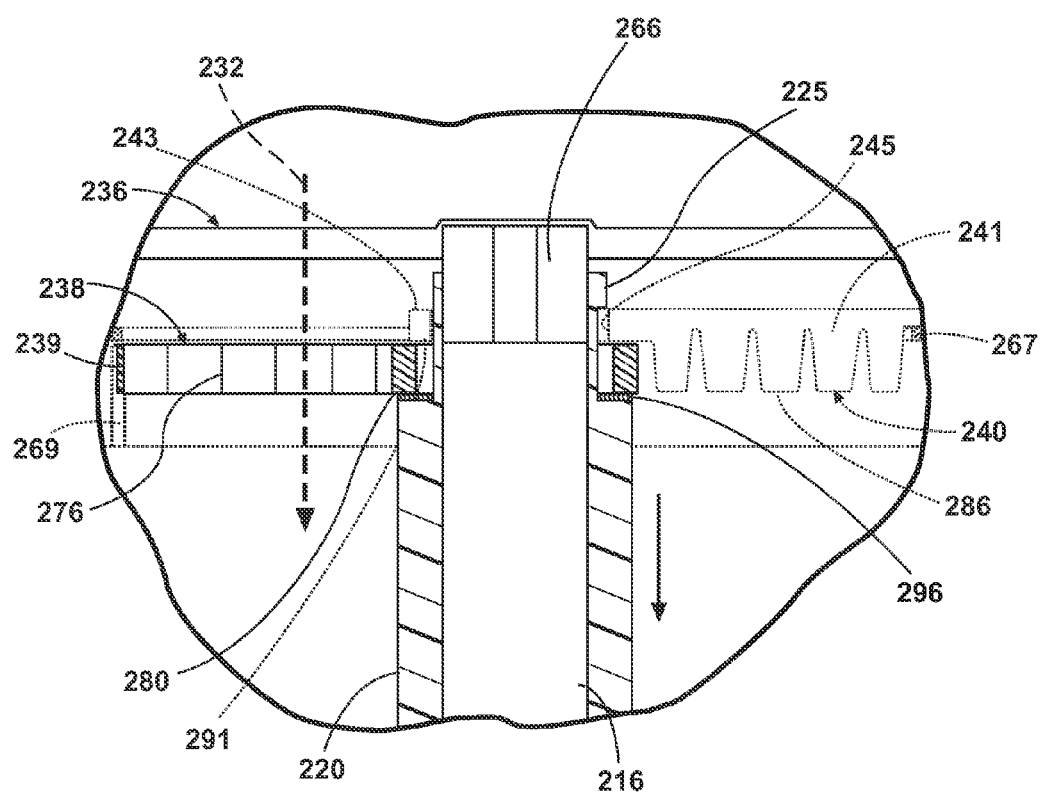
FIG. 10A is a partial schematic view of the food processor of FIG. 9 with a dicing tool in a first position and a clean-out tool in a stored position.
Figure 10B:
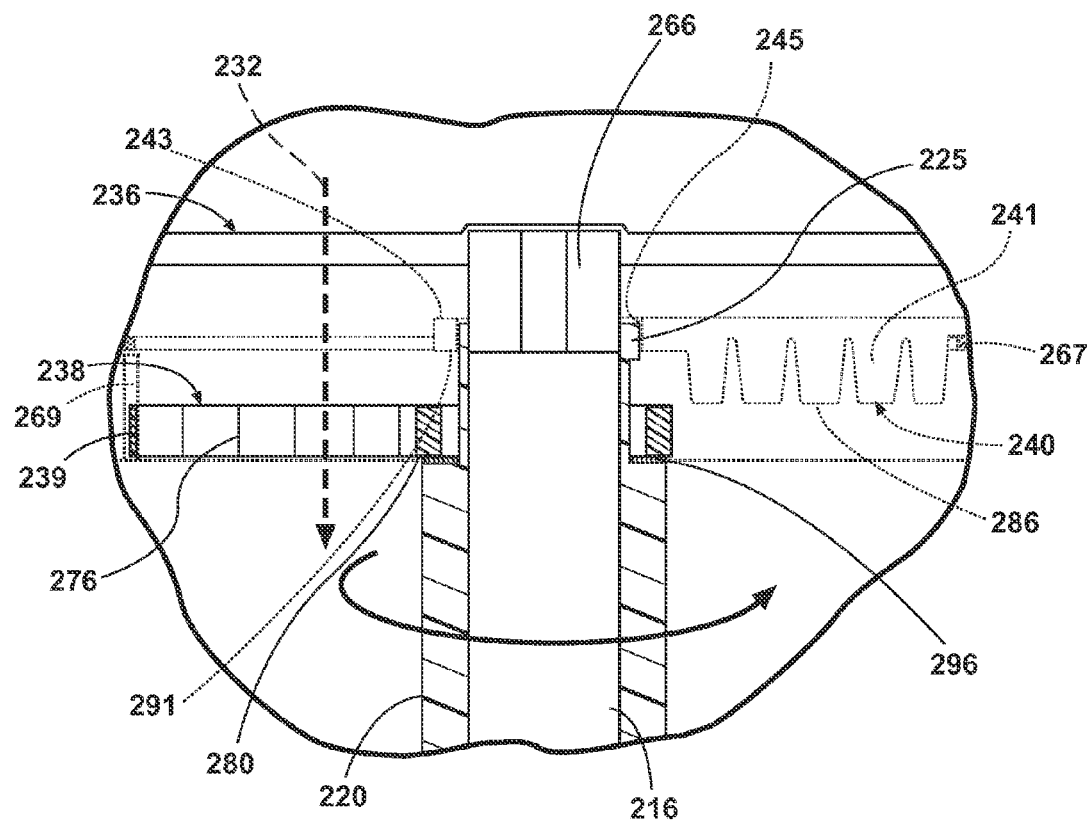
FIG. 10B is a partial schematic view of the food processor of FIG. 9 with the dicing tool in a second lowered position.
Figure 10C:
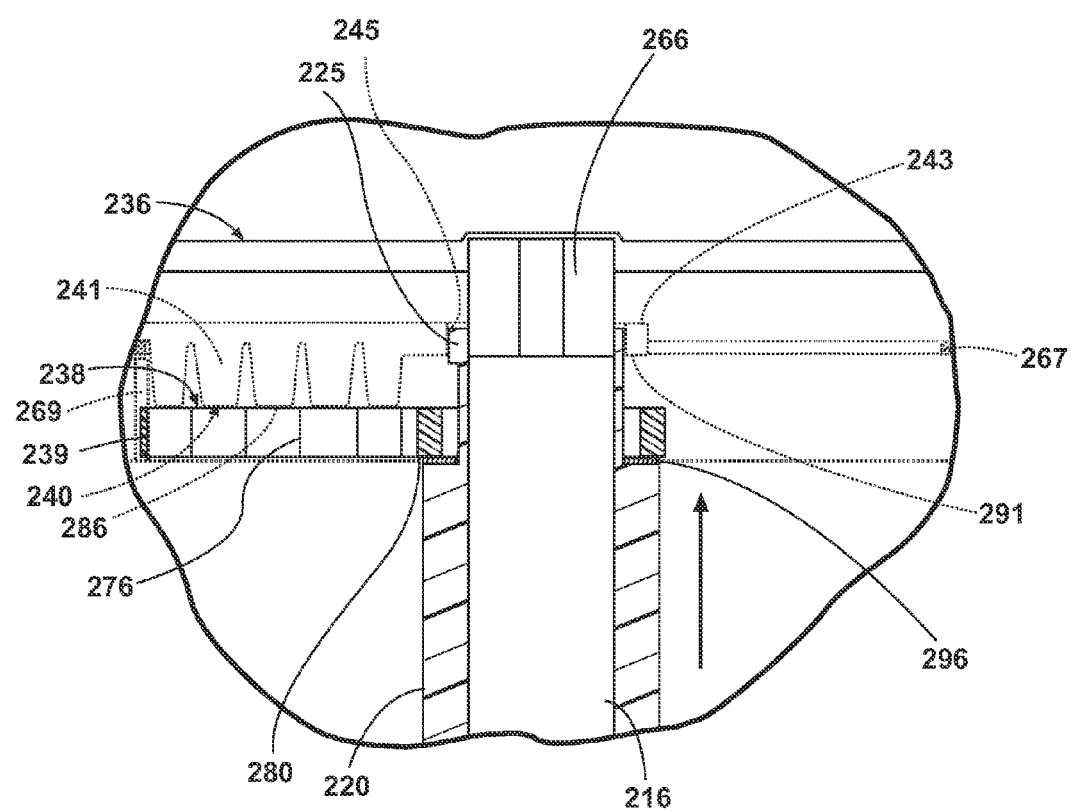
FIG. 10C is a partial schematic view of the food processor of FIG. 9 with the dicing tool in the second lowered position and the clean-out tool rotated into a cleaning position.
Figure 10D:
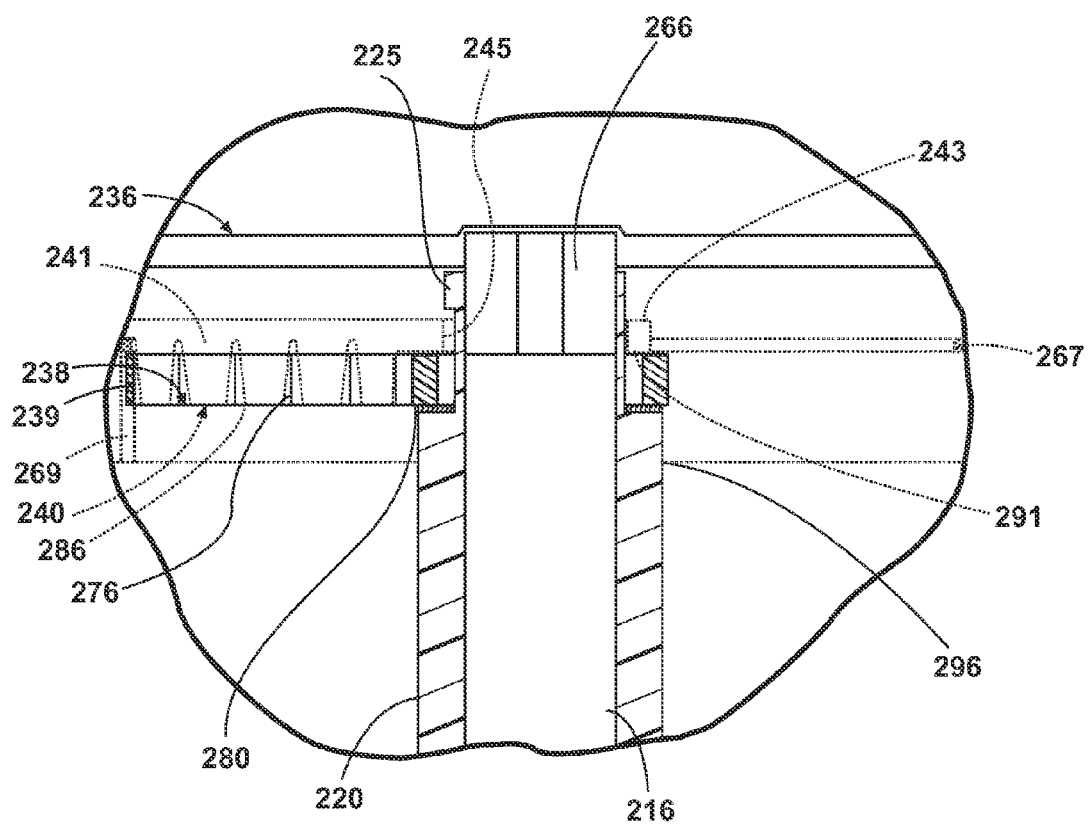
FIG. 10D is a partial schematic view of the food processor of FIG. 9 with the dicing tool raised into the first position and the clean-out too in the cleaning position.

The use of the clean-out tool 240 for cleaning out the dicing element 276 is illustrated in FIGS. 10A-D. Beginning with FIG. 10A, the dicing tool 238 is shown in the first raised position and the clean-out tool 240 is in a stored position. The sleeve 220 may then be axially lowered in response to the controller 242 actuating the solenoid motor 218. The axial lowering of the sleeve 220 allows the dicing tool 238 to lower through gravitational forces to a lowered position and mates the keyway 245 of the clean-out tool 240 with the key structure 225 on the upper portion 223 of the sleeve 220 as illustrated in FIG. 10B. Once the sleeve 220 mates with the clean-out tool 240, the controller 242 may then signal the motor 214 to rotate the drive shaft 252 and thus the output shaft 216 and sleeve 220 until the clean-out body 241 is above the dicing element 276 as illustrated in FIG. 10C. Once the clean-out body 241 is moved into the cleaning position above the dicing tool 238 and the multiple projections 286 are over the dicing openings 282, the solenoid motor 218 is activated to axially raise the sleeve 220 to raise the dicing tool 238 into the clean-out body 241 such that the dicing tool 238 is again in the first position as illustrated in FIG. 10D. As the dicing tool 238 is raised into the first position, any food remaining in the dicing openings 282 may be purged from the dicing element 276 as the multiple projections 286 are brought into the dicing openings 282.

To return the clean-out tool 240 to the stored position, the previous operation is reversed. That is, the controller 242 then signals the solenoid motor 218 to lower the sleeve 220 along the output shaft 216 so that the dicing tool 238 lowers through gravitational forces and the keyway 245 mates with the key structure 225 on the upper portion 223 of the sleeve 220. The controller 242 then signals the motor 214 to rotate the drive shaft 252 and thus the output shaft 216 and sleeve 220 until the clean-out tool 240 is in the stored position after which the solenoid motor 218 is activated to raise the sleeve 220 along the output shaft 216 so that the dicing tool raises back to the first position.

The above described embodiments allow for a variety of benefits including that the dicing tools may be cleaned by the cleanout tool without the need to remove the lid of the food processor. While such cleaning has been described with respect to an automated drive-mechanism it is contemplated that any of the above embodiments may include a drive mechanism that may be operated manually by a user. Any suitable drive mechanism may be used including, by way of non-limiting example, that the sleeve may be operably coupled with a manually-actuable lever. Such a lever may extend through a space in either the base or the bowl such that the user may access the lever and may raise, lower, and rotate the sleeve to effect a movement of either the dicing element and/or the clean-out body as described above.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention that is defined in the appended claims.

What is claimed is:

1. A food processor comprising:
a receptacle configured to receive processed food;
a food guide configured to receive food for processing and in communication with the receptacle to at least partially define a food processing path from the food guide to the receptacle;
a cutting tool selectively movable through the food processing path to cut food as it passes through the food processing path;
a dicing tool having multiple dicing openings selectively located in the food processing path, between the cutting tool and the receptacle, having multiple intersecting elements defining multiple dicing openings through which the cut food must pass to dice the cut food;
a clean-out tool having projections sized to be received within the dicing openings; and
a drive mechanism coupled to the dicing tool to selectively move the dicing tool into the clean-out tool to remove food remaining in the dicing openings.

2. The food processor according to claim 1, wherein the drive mechanism comprises a reciprocating shaft coupled to the dicing tool to move the dicing tool such that the projections are moved into and out of the dicing openings.

3. The food processor according to claim 2, wherein the drive mechanism further comprises an actuator for rotating the reciprocating shaft to move the dicing tool between a use position, where the dicing openings are within the food processing path, and a non-use position where the dicing openings are out of the food processing path.

4. The food processor according to claim 3, wherein the actuator is a motor coupled to the reciprocating shaft to rotate the dicing tool between the use position and the non-use position.

5. The food processor according to claim 4, wherein the drive mechanism comprises a drive shaft coupling the motor to the cutting tool and the reciprocating shaft comprises a sleeve slidably mounted to the drive shaft and rotatable with the drive shaft, wherein the rotation of the drive shaft rotates the dicing tool between the use and non-use positions and the slidable movement of the sleeve relative to the shaft moves the dicing tool into and out of the clean-out tool.

6. The food processor according to claim 1, wherein the drive mechanism is configured to rotate, raise, and lower the dicing tool, such that the dicing tool may be located in a use position, where the dicing tool is within the food processing path, rotated to a non-use position, where the dicing tool is moved out of the food processing path, raised into the clean-out tool from the non-use position such that the projections enter into the dicing openings, lowered back to the non-use position, and rotated back to the use position.

7. The food processor according to claim 1, further comprising a housing in which the food processing path is located.

8. The food processor according to claim 7, wherein the housing comprises a bowl and a lid, which is removably mounted to the bowl, with the bowl defining the receptacle and the lid defining at least a portion of the food guide.

9. A food processor comprising:
a receptacle configured to receive processed food;
a food guide configured to receive food for processing and in communication with the receptacle to at least partially define a food processing path from the food guide to the receptacle;
a cutting tool selectively movable through the food processing path to cut food as it passes through the food processing path;
a dicing tool having multiple dicing openings located in the food processing path, between the cutting tool and the receptacle, having multiple intersecting elements defining multiple dicing openings through which the cut food must pass to dice the cut food;
a clean-out tool having multiple projections sized to be received within the dicing openings; and
a drive mechanism selectively operably coupled to the dicing tool and the clean-out tool to selectively move the clean-out tool into the dicing tool to remove food remaining in the dicing openings;
wherein the drive mechanism effects axial movement of the dicing tool out of a rotational path of the clean-out tool, then rotates the clean-out tool into axial alignment with the dicing tool, and then axially moves the dicing tool to insert the projections into the dicing openings.

10. The food processor according to claim 9, wherein the drive mechanism comprises a reciprocating element coupled to the clean-out tool to move the clean-out tool into and out of the dicing openings.

11. The food processor according to claim 10, wherein the drive mechanism further comprises an actuator for rotating the reciprocating element to move the clean-out tool between a use position, where the clean-out tool is moved into and out of the dicing openings, and a non-use position, where the clean-out tool is out of the food processing path.

12. The food processor according to claim 11, wherein the actuator is a motor coupled to the reciprocating element to rotate the clean-out tool between the use and non-use positions.

13. The food processor according to claim 12, wherein the drive mechanism comprises a drive shaft coupling the motor to the cutting tool and the reciprocating element comprises a sleeve slidably mounted to the drive shaft and rotatable with the drive shaft, wherein the reciprocal sliding movement of the sleeve relative to the shaft moves the clean-out tool into and out of the dicing openings, and the rotation of the drive shaft rotates the clean-out tool between the use and non-use positions.

14. The food processor according to claim 13, wherein when the sleeve is slidably moved downwards on the drive shaft the dicing tool is no longer supported in a raised position.

15. The food processor according to claim 14, wherein the sleeve includes a key and the clean-out tool includes a keyway and wherein when the sleeve is slidably moved downwards the key is operably received within the keyway such that rotation of the sleeve rotates the clean-out tool.

* * * * *